United States Patent
Yamamoto et al.

(10) Patent No.: US 7,109,628 B2
(45) Date of Patent: Sep. 19, 2006

(54) MOTOR HAVING SUPPLY BRUSHES

(75) Inventors: Toshio Yamamoto, Kosai (JP); Shinji Santo, Toyohashi (JP); Kazumitsu Moriya, Kosai (JP); Masayuki Kuwano, Kosai (JP); Kaname Egawa, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 192 days.

(21) Appl. No.: 10/727,343

(22) Filed: Dec. 1, 2003

(65) Prior Publication Data

US 2004/0145268 A1 Jul. 29, 2004

(30) Foreign Application Priority Data

Jan. 23, 2003 (JP) ............... 2003-014908

(51) Int. Cl.
  *H02K 23/20* (2006.01)
  *H02K 23/04* (2006.01)
  *H02K 3/28* (2006.01)
(52) U.S. Cl. ................ 310/239; 310/248; 310/220
(58) Field of Classification Search .......... 310/204, 310/233, 197, 241, 220, 248, 239
  See application file for complete search history.

(56) References Cited

U.S. PATENT DOCUMENTS

| | | | | |
|---|---|---|---|---|
| 5,128,577 A | * | 7/1992 | Kobayashi | 310/233 |
| 5,252,599 A | * | 10/1993 | Girard et al. | 514/456 |
| 5,744,890 A | * | 4/1998 | Yamaguchi et al. | 310/248 |
| 6,127,759 A | * | 10/2000 | Tanaka et al. | 310/233 |
| 6,756,717 B1 | * | 6/2004 | Yamamoto et al. | 310/225 |
| 6,891,304 B1 | * | 5/2005 | Cros et al. | 310/198 |
| 2002/0121831 A1 | | 9/2002 | Egawa et al. | 310/216 |
| 2004/0145268 A1 | * | 7/2004 | Yamamoto et al. | 310/249 |

FOREIGN PATENT DOCUMENTS

| | | | |
|---|---|---|---|
| JP | 58-215965 | * | 12/1983 |
| JP | 2002-119031 | | 4/2002 |

* cited by examiner

*Primary Examiner*—Karl Tamai
(74) *Attorney, Agent, or Firm*—Marsh Fischmann & Breyfogle LLP

(57) ABSTRACT

A motor has a plurality of excitation coils, a commutator having a plurality of segments, a plurality of supply brushes and a short-circuit line. Each coil is connected to corresponding ones of the segments. The supply brushes include a plurality of supply brushes each having one of an anode and a cathode. At least one supply brush has the other one of an anode and a cathode. The supply brushes each simultaneously contact different one of the segments. The short-circuit line short-circuits segments that simultaneously contact the supply brushes of the same pole. The supply brushes of the same pole separate from the short-circuited segments at different times.

13 Claims, 9 Drawing Sheets

MOTOR HAVING SUPPLY BRUSHES

BACKGROUND OF THE INVENTION

The present invention relates to a motor having supply brushes.

A number of technologies have been proposed to reduce abrasion of supply brushes used in direct-current motors, thereby extending the life of the brushes and the motors.

For example, high-resistance supply brushes reduce sparks generated at the supply brushes. Therefore, abrasion due to sparks is suppressed. This extends the life of the supply brushes.

However, high-resistance supply brushes create a great electrical power loss, which lowers the power of the motor.

To eliminate the drawback, Japanese Laid-Open Patent Publication No. 2002-119031 discloses a motor with a brush that has high-resistance portions and a low-resistance portion. The high-resistance portions are provided at a part of the supply brush that first contacts a commutator segment and a part that lastly separates from the segment. The remainder of the supply brush is the low-resistance portion.

Since the high-resistance portions of the supply brush suppress the generation of sparks, the life of the supply brush is scarcely reduced by abrasion. Further, the low resistance portion of the supply brush lowers the electrical resistance and suppresses electrical loss. This prevents the motor power from being lowered.

However, since the structure of the above described supply brush is complicated, the manufacture of the motor is burdensome and costly.

Particularly, when applying the technology of the publication to a motor having more than one set of two or more supply brushes, two or more brushes (for example, three or more brushes) in each set are anodes or cathodes, the cost will be undesirably increased.

SUMMARY OF THE INVENTION

Accordingly, it is an objective of the present invention to provide a motor that extends the lives of supply brushes at low cost.

To achieve the above objective, the present invention provides a motor. The motor includes a plurality of excitation coils, a commutator having a plurality of segments, a plurality of supply brushes and a short-circuit line. Each coil is connected to corresponding ones of the segments. The supply brushes are slidable on the segments. The supply brushes include a plurality of supply brushes each having one of an anode and a cathode. At least one supply brush has the other one of an anode and a cathode. Each of the supply brushes simultaneously contact different one of the segments. The short-circuit line short-circuits segments that simultaneously contact the supply brushes of the same pole. The supply brushes of the same pole separate from the short-circuited segments at different times.

The present invention also provides another motor. The motor includes a plurality of excitation coils, a commutator having a plurality of segments, a first brush and a second brush. Each coil is connected to corresponding ones of the segments. The first brush supplies electric current to the segments. The second brush does not supply electric current to the segments. Each brush is arranged to slide on the segments. When the first brush contacts one of the segments, the second brush simultaneously contacts another segment of the same potential as the segment contacting the first brush. When the first brush separates from the contacting segment, the second brush separates from the segment of the same potential as the segment from which the first brush has separated after a delay.

The present invention also provides another motor. The motor includes a plurality of excitation coils, a commutator having a plurality of segments, a first brush and a second brush. Each coil is connected to corresponding ones of the segments. The first brush supplies electric current to the segments. The second brush does not supply electric current to the segments. When the first brush separates from any of the segments due to rotation of the commutator, the second brush short-circuits, for a predetermined period, a first segment, which is at the same potential as the segment from which the first brush is separating, with a second segment, which is adjacent to the first segment.

The present invention also provides another motor. The motor includes six magnetic poles, an armature, eight excitation coils, a commutator, a plurality of short-circuiting members and a plurality of supply brushes. The magnetic poles are arranged at equal angular intervals along a circumferential direction. Each adjacent pair of the magnetic poles has different magnetic properties. The armature has eight teeth, the teeth being arranged at equal angular intervals along a circumferential direction. Each of the excitation coils is wound about one of the teeth by way of concentrated winding. The commutator has twenty-four segments. Ends of each excitation coil are connected to corresponding ones of the segments. Each short-circuiting member connects two of the segments that are connected to the excitation coils and one of the segments that are not connected to the excitation coils to one another, such that two of the excitation coils that are arranged at a 135° interval about the axis of the armature are simultaneously supplied with electricity. The segments in each group of short-circuited three segments are arranged at 120° intervals. The supply brushes are slidable on the segments. The supply brushes include first and second brushes at the same pole. The second brush has a higher electrical resistance than the first supply brush. The first and second supply brushes simultaneously contact the two segments in one of the sets of three segments that are connected to the corresponding excitation coils. The first and second brushes are arranged at an angular interval less than 120°, so that, when the first brush separates from the contacting segment, the second brush separates from the segment that is short-circuited with the segment from which the first brush has separated after a delay.

The present invention also provides another motor. The motor includes six magnetic poles, an armature, eight excitation coils, a commutator, a plurality of short-circuiting members and a plurality of supply brushes. The magnetic poles are arranged at equal angular intervals along a circumferential direction. Each adjacent pair of the magnetic poles has different magnetic properties. The armature has eight teeth. The teeth are arranged at equal angular intervals along a circumferential direction. Each of the excitation coils is wound about one of the teeth by way of concentrated winding. The commutator has twenty-four segments. Ends of each excitation coil are connected to corresponding ones of the segments. Each short-circuiting member connects two of the segments that are connected to the excitation coils and one of the segments that are not connected to the excitation coils to one another, such that two of the excitation coils that are arranged at a 135° interval about the axis of the armature are simultaneously supplied with electricity. The segments in each group of short-circuited three segments are arranged at 120° intervals. The supply brushes are slidable on the segments. The supply brushes include a first brash that supplies electricity to the segments and a second brush the: does not supply electricity to the segments. The first and second supply brushes simultaneously contact the two segments in one of the sets of three segments that are connected to the corresponding excitation coils. The first and second brushes are arranged at an angular interval less than 120°, so that, when the first brush separates from the contacting segment, the second brush separates from the segment that is short-circuited with the segment from which the first brush has separated after a delay.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings which.

DETAILED DESCRIPTION OF THE PREFERRED EMBODIMENTS

A first embodiment of the present invention will now be described referring to FIGS. 1(a) to 3.

As shown in FIGS. 1(a) to 3, a motor 51 has a four-pole permanent magnet and an armature 52 that is rotatably provided in a position inward of the permanent magnet. The armature 52 is rotated clockwise only as viewed in FIGS. 1(a) and 1(b).

Figure 1:
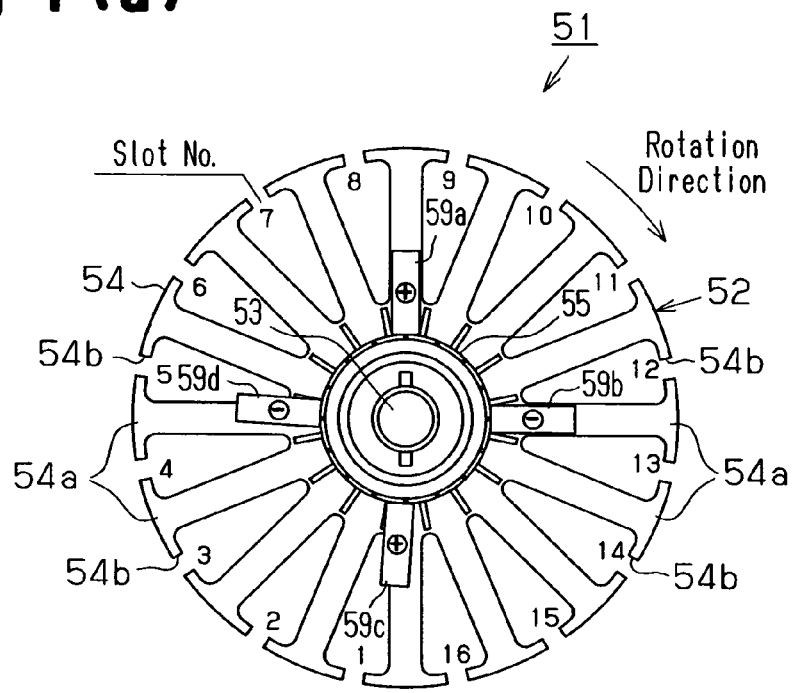
FIG. 1(a) is a schematic view illustrating a motor according to a first embodiment of the present invention.
FIG. 1(b) is an enlarged view illustrating the commutator of the motor shown in FIG. 1(a)
Figure 1:
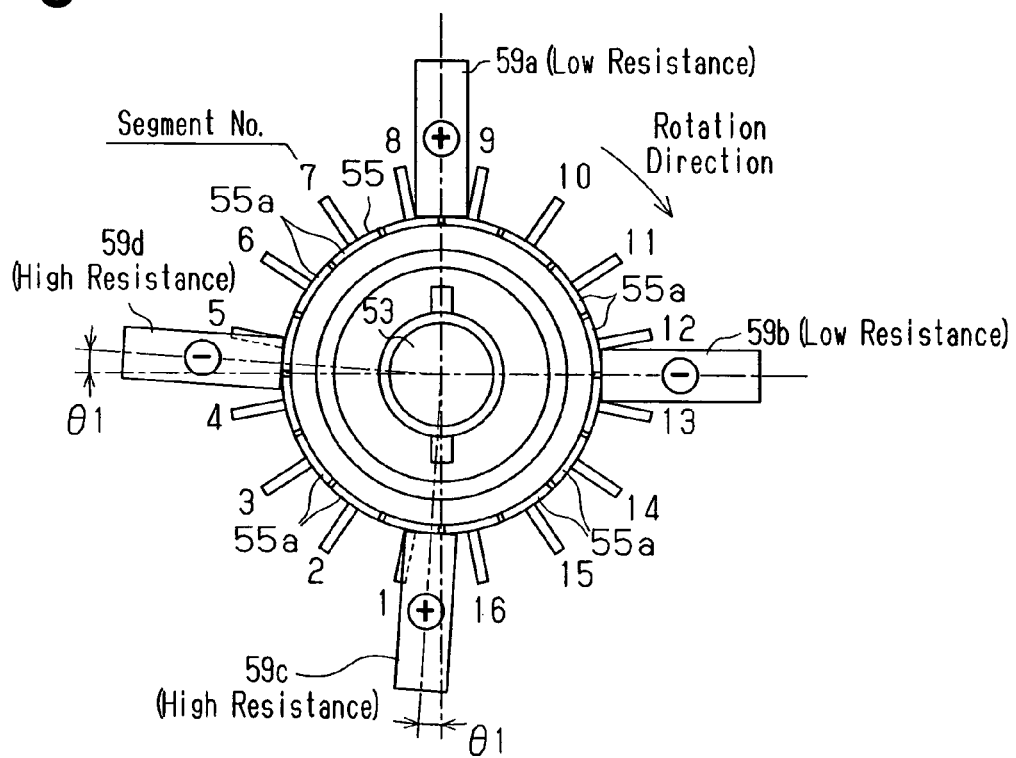
Figure 2:
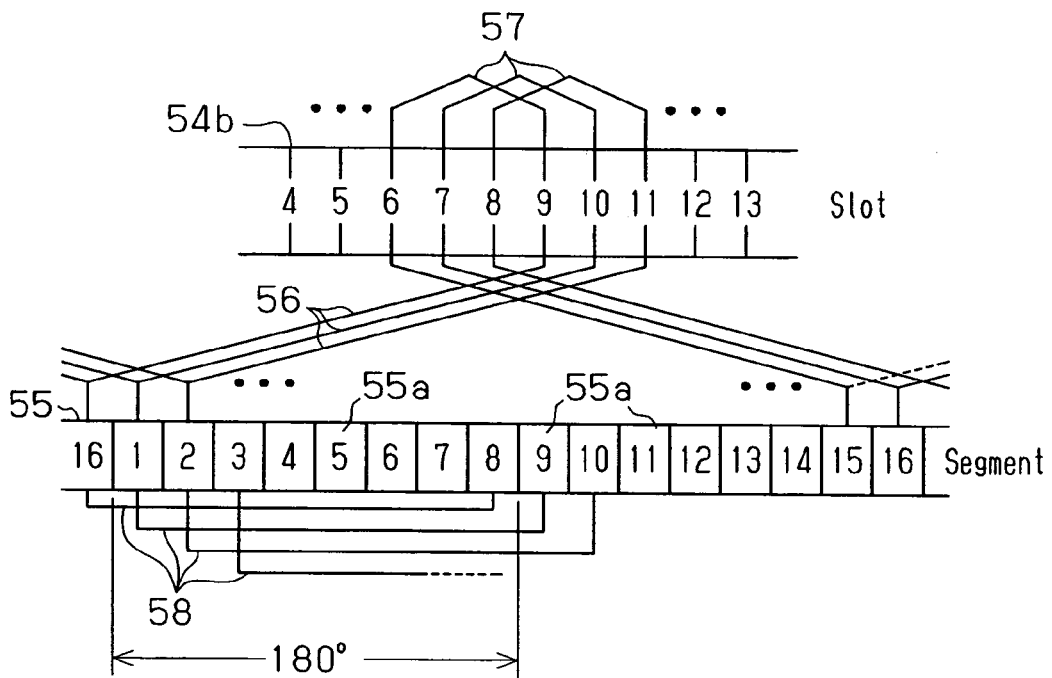
FIG. 2 is a developed diagram showing the wires and the commutator of the motor shown in FIG. 1(a)

The armature 52 includes a rotary shaft 53, a core 54, a commutator 55, and wires 56 (see FIG. 2).

The core 54 is fixed to the rotary shaft 53. The core 54 extends radially outward from the center and includes sixteen teeth 54a about which the wires 56 are wound. A slot 54b for accommodating wires 56 is defined between each adjacent pair of the teeth 54a. As shown in FIG. 1(a), the core 54 has sixteen slots 54b. Numerals 1 to 16 are given to the slots 54b in order along the circumferential direction of the core 54.

The commutator 55 is fixed to the rotary shaft 53. As shown in FIG. 1(b), sixteen commutator segments 55a are fixed to the outer circumference of the commutator 55. As shown in FIG. 1(b), numerals 1 to 16 are given to the commutator segments 55a in order along the circumferential direction of the commutator 55.

As shown in FIG. 2, the wires 56 are wound by way of distributed winding. That is, each wire 56 is wound about consecutive three of the teeth 54a. One of the wires 56 extends from the No. 2 segment 55a to the No. 1 segment 55a, and is wound about consecutive three of the teeth 54a through the No. 11 slot 54b and the No. 8 slot 54b to form an excitation coil 57. One of the wires 56 extends from the No. 1 segment 55a to the No. 16 segment 55a, and is wound about consecutive three of the teeth 54a through the No. 10 slot 54b and the No. 7 slot 54b to form an excitation coil 57. One of the wires 56 extends from the No. 16 segment 55a to the No. 15 segment 55a, and is wound about consecutive three of the teeth 54a through the No. 9 slot 54b and the No. 6 slot 54b to form an excitation coil 57. The winding of wires 56 is repeated so that the wires 56 are connected to all the segments 55a and wound about all the teeth 54a through all the slots 54b. As a result, sixteen excitation coils 57 are formed.

Figure 3:
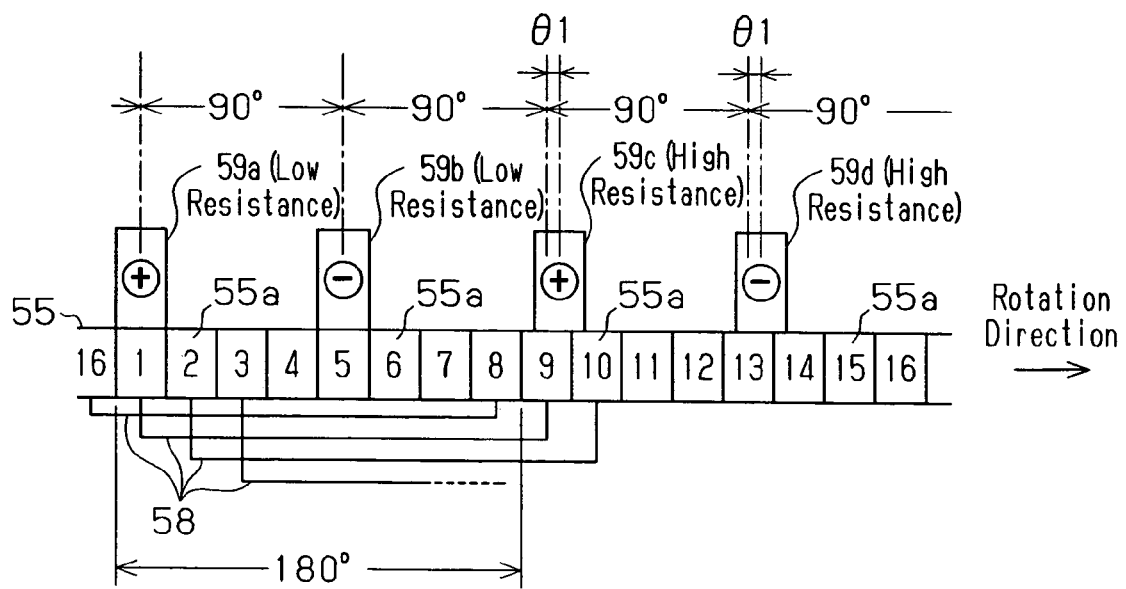
FIG. 3 is a developed diagram showing the commutator.

As shown in FIGS. 2 and 3, each segment 55a is short-circuited with another predetermined one of the segments 55a with a short-circuit line 58. For example, the No. 16 segment 55a and the No. 8 segment 55a are short-circuited with a short-circuit line 58. The No. 1 segment 55a and the No. 9 segment 55a are short-circuited with a short-circuit line 58. The No. 2 segment 55a and the No. 10 segment 55a are short-circuited with a short-circuit line 58. That is, each pair of the segments 55a that are symmetrical with respect to the axis of the rotary shaft 53 are short-circuited with one of the short-circuit lines 58.

The motor 51 includes a first main brush 59a, which is an anode, a second main brush 59b, which is a cathode, a first sub-brush 59c, which is an anode, and a second sub-brush 59d, which is a cathode. The four brushes 59a to 59d slide on the commutator 55. The brushes 59a to 59d are identical and the widths of the brushes 59a to 59d are the same as the width of each segment 55a. The first and second main brushes 59a, 59b have a low resistance. The first and second sub-brushes 59c, 59d have a high resistance. The first main brush 59a and the first sub-brush 59c form a first brush group. The second main brush 59b and the second sub-brush 59d form a second brush group. The first main brush 59a and the first sub-brush 59c each have an effective contacting width along the circumferential direction of the commutator 55, in which effective contacting width each supply brush contacts segments 55a. The effective contacting widths are the same as the circumferential width of the segments 55a. Also, the second main brush 59b and the second sub-brush 59d each have an effective contacting width along the circumferential direction of the commutator 55, in which effective contacting width each supply brush contacts segments 55a. The effective contacting widths are the same as the circumferential width of the segments 55a.

The four brushes 59a to 59d are spaced at 90° intervals about the axis of the rotary shaft 53. Specifically, the second main brush 59b is displaced from the first main brush 59a by 90° with respect to a rotation direction (direction indicated by an arrow in FIG. 3). The first sub-brush 59c is displaced from the first main brush 59a by a predetermined angle (180°+θ1) with respect to the rotation direction of the commutator 55. The second sub-brush 59d is displaced from the second main brush 59b by a predetermined angle (180°+θ1) with respect to the rotation direction of the commutator 55.

Therefore, when the first main brush 59a is contacting the No. 1 segment 55a only as shown in FIG. 3, the first sub-brush 59c contacts the No. 9 segment 55a, which is short-circuited with the No. 1 segment 55a, and the No. 10 segment 55a, which is located at an advancing side of the No. 9 segment 55a in the rotation direction. At this time, most of the first sub-brush 59c is contacting the No. 9 segment 55a. The second main brush 59b contacts the No. 5 segment 55a only, and the second sub-brush 59d contacts the No. 13 segment 55a, which is short-circuited with the No. 5 segment 55a, and the No. 14 segment 55a, which is located at an advancing side of the No. 13 segment 55a in the rotation direction. At this time, most of the second sub-brush 59d is contacting the No. 13 segment 55a.

When the commutator 55 is rotated in rotation direction as indicated in FIG. 3, the first main brush 59a and the first sub-brush 59c, which form the first brush group, separate from the short-circuited two of the segments 55a at different times of a predetermined interval. Specifically, the first sub-brush 59c, which has a high resistance, separates from the No. 9 segment 55a when a predetermined time has elapsed since the first main brush 59a, which has a low resistance, separates from the No. 1 segment 55a. The second main brush 59b and the second sub-brush 59d, which form the second brush group, separate from the short-circuited two of the segments 55a at different times of a predetermined interval. Specifically, the second sub-brush 59d, which has a high resistance, separates from the No. 13 segment 55a when a predetermined time has elapsed since the second main brush 59b, which has a low resistance, separates from the No. 5 segment 55a. Thus, sparks are generated only when each of the high resistance sub-brushes 59c, 59d separates from any of the segments 55a.

Normally, sparks are generated when a brush starts contacting a segment and when a brush separates from a segment. Particularly, great sparks are generated when a brush separates from a segment, and the generated great sparks accelerate abrasion of the brush. However, in this embodiment, sparks are generated only at the high-resistance sub-brushes 59c, 59d, and are not generated at the main brushes 59a, 59b. Since the sub-brushes 59c, 59d have a high resistance, generated sparks are small.

Accordingly, the lives of the brushes 59a to 59d are extended, which extends the life of the motor 51. Since the brushes 59a to 59d need not have multi-layered structure having high-resistance portions and low-resistance portions, the cost is reduced. Since the main brushes 59a, 59b have a low resistance, an electrical loss is suppressed. This minimizes a decrease in the power of the motor 51.

A second embodiment of the present invention will now be described with reference to FIG. 4. To facilitate illustration, like or the same reference numerals are given to those components that are like or the same as the corresponding components of the embodiment of FIGS. 1(a) to 3 and detailed explanations are omitted.

Figure 4:
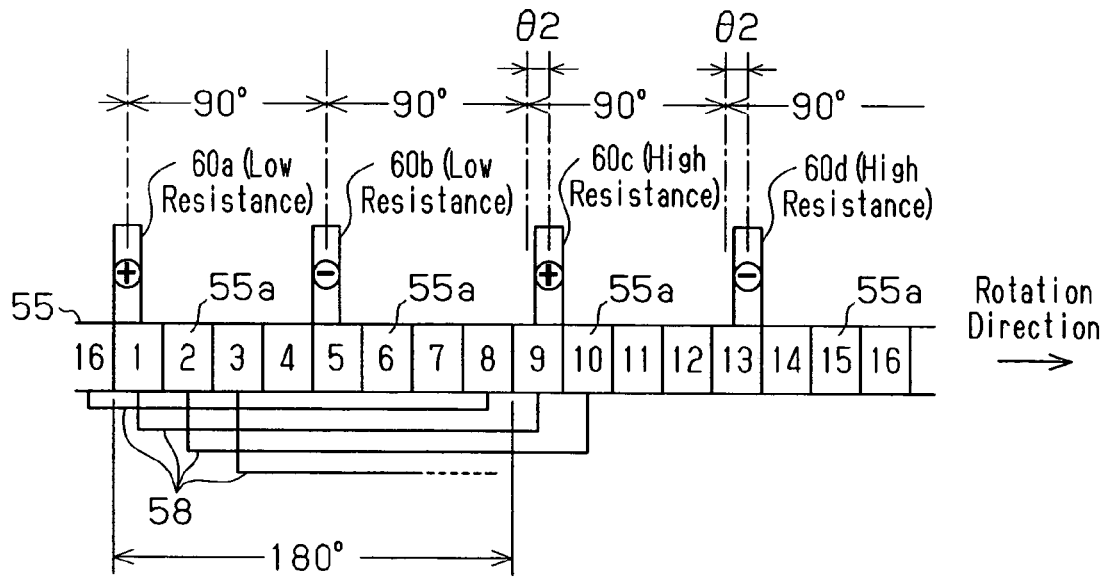
FIG. 4 is a developed diagram showing a commutator according to a second embodiment.

As shown in FIG. 4, first and second main brushes 60a, 60b, which are supply brushes of the second embodiment, and sub-brushes 60c, 60d have the same shape. The width of the brushes 60a to 60d is half the width of each segment 55a. The main brushes 60a, 60b have a low resistance, and the sub-brushes 60c, 60d have a high resistance. The first main brush 60a and the first sub-brush 60c form a first brush group. The second main brush 60b and the second sub-brush 60d form a second brush group.

The brushes 60a to 60d are arranged at 90° intervals. Specifically, the first main brush 60a, which is an anode, is displaced from the second main brush 60b, which is a cathode, by 90° with respect to the rotation direction of the commutator 55. The first sub-brush 60c, which is an anode, is displaced from the first main brush 60a by a predetermined angle (180°+θ2) with respect to the rotation direction. The second sub-brush 60d, which is a cathode, is displaced from the second main brush 60b by a predetermined angle (180°+θ2) with respect to the rotation direction. The angle θ2 corresponds to one-half of the width of each segment 55a (which, in this case, is the width of each of the brushes 60a to 60d) along the circumferential direction of the commutator 55.

When the first main brush 60a is contacting a trailing portion of the No. 1 segment 55a with respect to the rotation direction, the first sub-brush 60c contacts an advancing portion of the No. 9 segment 55a, which is short-circuited with the No. 1 segment 55a. In this case, the second main brush 60b contacts a trailing portion of the No. 5 segment 55a with respect to the rotation direction, and the second sub-brush 60d contacts an advancing portion of the No. 13 segment 55a, which is short-circuited with the No. 5 segment 55a.

When the commutator 55 is rotated in rotation direction as indicated in FIG. 4, the first main brush 60a and the first sub-brush 60c, which form the first brush group, separate from the short-circuited two of the segments 55a at different times of a predetermined interval. Specifically, the first sub-brush 60c, which has a high resistance, separates from the No. 9 segment 55a when a predetermined time has elapsed since the first main brush 60a, which has a low resistance, separates from the No. 1 segment 55a. The second main brush 60b and the second sub-brush 60d, which form the second brush group, separate from the short-circuited two of the segments 55a at different times of a predetermined interval. Specifically, the second sub-brush 60d, which has a high resistance, separates from the No. 13 segment 55a when a predetermined time has elapsed since the second main brush 60b, which has a low resistance, separates from the No. 5 segment 55a.

This configuration permits sparks to be generated only at the sub-brushes 60c, 60d, which have a high resistance. As a result, abrasion of the brushes 60a to 60d due to sparks is reduced. This extends the lives of the brushes 60a to 60d, and thus extends the life of the motor. Since the brushes 60a to 60d need not have a multi-layered structure with high-resistance portions and low-resistance portions as discussed in the prior art section, the cost is reduced. Since the main brushes 60a, 60b have a low resistance, an electrical loss is suppressed. This minimizes a decrease in the power of the motor.

A third embodiment of the present invention will now be described with reference to FIG. 5.

A motor of this embodiment has six permanent magnets M, and eight excitation coils 62a to 62h. The motor has a commutator 63. Twenty-four commutator segments 63a are fixed to the circumferential surface of the commutator 63. Numerals 1 to 24 are given to the segments 63a in order along the circumferential direction of the commutator 63.

Wires 61 are wound about teeth (not shown) by way of concentrated winding and form the eight excitation coils 62a to 62h. Specifically, one of the wires 61 extends from the No. 2 segment 63a to the No. 3 segment 63a, and is wound about a predetermined tooth to form the first excitation coil 62a.

One of the wires 61 extends from the No. 5 segment 63a to the No. 6 segment 63a, and is wound about a predetermined tooth to form the second excitation coil 62b. One of the wires 61 extends from the No. 8 segment 63a to the No. 9 segment 63a, and is wound about a predetermined tooth to form the third excitation coil 62c. One of the wires 61 is connected to the No. 11 segment 63a and the No. 12 segment 63a, and is wound about a predetermined tooth to form the fourth excitation coil 62d. One of the wires 61 extends from the No. 14 segment 63a to the No. 15 segment 63a, and is wound about a predetermined tooth to form the fifth excitation coil 62e. One of the wires 61 extends from the No. 17 segment 63a to the No. 18 segment 63a, and is wound about a predetermined tooth to form the sixth excitation coil 62f. One of the wires 61 extends from the No. 20 segment 63a to the No. 21 segment 63a, and is wound about a predetermined tooth to form the seventh excitation coil 62g. One of the wires 61 extends from the No. 23 segment 63a to the No. 24 segment 63a, and is wound about a predetermined tooth to form the eighth excitation coil 62h.

In the commutator 63, any thee of the segments 63a that are spaced apart by 120° intervals are short-circuited with a short-circuit line 64. Specifically, the No. 1, No. 9, and No. 17 segments 63a are short-circuited with a short-circuit line 64, and the No. 2, No. 10, and No. 18 segments 63a are short-circuited with a short-circuit line 64. The No. 3, No. 11, and No. 19 segments 63a are short-circuited, and the No. 4, No. 12, and No. 20 segments 63a are short-circuited. The No. 5, No. 13, and No. 21 segments 63a are short-circuited, and the No. 6, No. 14, and No. 22 segments 63a are short-circuited. The No. 7, No. 15, and No. 23 segments 63a are short-circuited, and the No. 8, No. 16, and No. 24 segments 63a are short-circuited.

First and second main brushes 65a, 65b, and first and second sub-brushes 65c, 65d slide on the commutator 63. The brushes 65a to 65d have the same shape, and the width (effective contacting width) of the brushes 65a to 65d is the same as the width of each segment 63a. The main brushes 65a, 65b have a low resistance, and the sub-brushes 65c, 65d have a high resistance. In this embodiment, the first main brush 65a and the first sub-brush 65c form a first brush group. The second main brush 65b and the second sub-brush 65d form a second brush group.

Electric current supplied from the main brush 65a is split into two. A portion of the current is supplied to the fourth excitation coil 62d, which is spaced from the first excitation coil 62a by 135°, the seventh excitation coil 62g, which is spaced from the fourth excitation coil 62d by 135°, and the second excitation coil 62b, which is separated from the seventh excitation coil 62g by 135°. The other portion of the current is supplied to the third excitation coil 62c, which is spaced from the sixth excitation coil 62f by 135°, the eighth excitation coil 62h, which is spaced from the third excitation coil 62c by 135°, and the fifth excitation coil 62e, which is separated from the eighth excitation coil 62e by 135°.

The first main brush 65a, which is an anode, and the second main brush 65b, which is a cathode, are spaced apart by 180°. The first sub-brush 65c, which is an anode, is displaced from the first main brush 65a by a predetermined angle (120°−θ3) with respect to the direction opposite to the rotation direction. The second sub-brush 65d, which is a cathode, is displaced from the second main brush 65b by a predetermined angle (120°−θ3) with respect to the direction opposite to the rotation direction.

When the first main brush 65a is contacting the No. 2 segment 63a only, the first sub-brush 65c contacts the No. 10 segment 63a, which is short-circuited with the No. 2 segment 63a, and the No. 9 segment 63a, which is located at an advancing side of the No. 10 segment 63a in the rotation direction. At this time, most of the first sub-brush 65c is contacting the No. 10 segment 63a. The second main brush 65b contacts the No. 14 segment 63a only, and the second sub-brush 65d contacts the No. 22 segment 63a, which is short-circuited with the No. 14 segment 63a, and the No. 21 segment 63a, which is located at an advancing side of the No. 22 segment 63a in the rotation direction. At this time, most of the second sub-brush 65d is contacting the No. 22 segment 63a.

Figure 5:
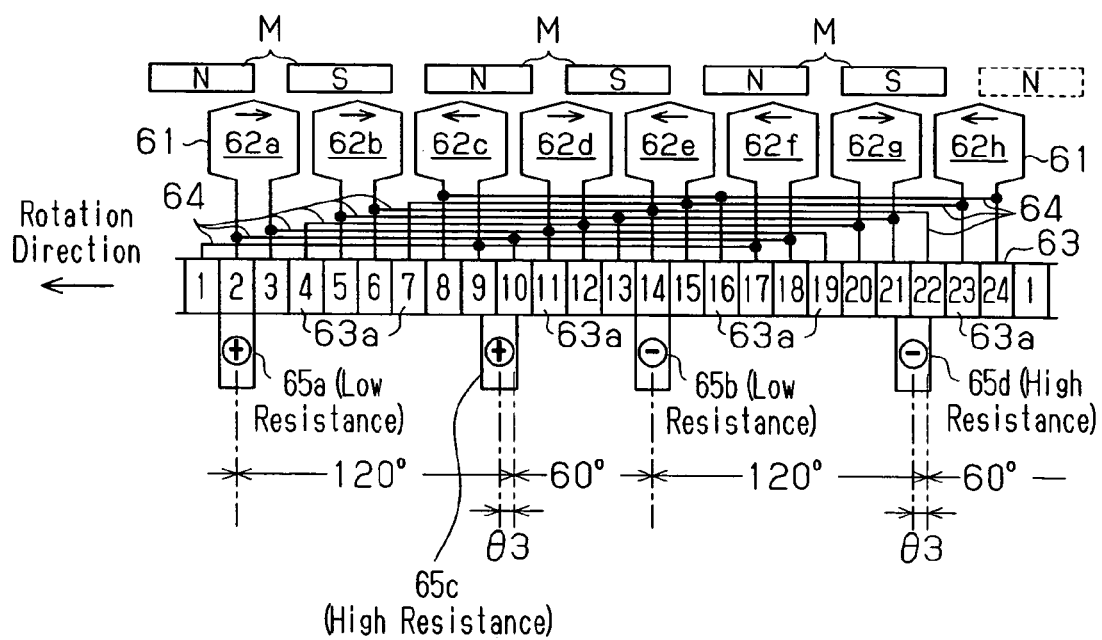
FIG. 5 is a developed diagram showing a commutator according to a third embodiment.

When the commutator 63 is rotated in rotation direction as indicated in FIG. 5, the first main brush 65a and the first sub-brush 65c, which form the first brush group, separate from the short-circuited two of the segments 63a at different times of a predetermined interval. Specifically, the first sub-brush 65c, which has a high resistance, separates from the No. 10 segment 63a when a predetermined time has elapsed since the first main brush 65a, which has a low resistance, separates from the No. 2 segment 63a. The second main brush 65b and the second sub-brush 65d, which form the second brush group, separate from the short-circuited two of the segments 63a at different times of a predetermined interval. Specifically, the second sub-brush 65d, which has a high resistance, separates from the No. 22 segment 63a when a predetermined time has elapsed since the second main brush 65b, which has a low resistance, separates from the No. 14 segment 63a.

This configuration permits sparks to be generated only at the sub-brushes 65c, 65d, which have a high resistance. As a result, abrasion of the brushes 65a to 65d due to sparks is reduced. This extends the lives of the brushes 65a to 65d, and thus extends the life of the motor. Since the brushes 65a to 65d need not have a multi-layered structure having high-resistance portions and low-resistance portions, the cost is reduced. Since the main brushes 65a, 65b have a low resistance, an electrical loss is suppressed. This minimizes a decrease in the power of the motor. Each wire 61 is wound about the corresponding tooth by way of concentrated winding. In general, the number of laps of a wire is greater in concentrated winding than distributed winding (lap winding or wave winding). That is, the number of laps of the wire is relatively great in each coil 62. This hinders commutation. However, since the brushes 65a to 65d are displaced from one another in this embodiment, the commutation is facilitated even if the wires are wound by way of concentrated winding.

A fourth embodiment of the present invention will now be described with reference to FIG. 6. To facilitate illustration, like or the same reference numerals are given to those components that are like or the same as the corresponding components of the embodiment of FIG. 5 and detailed explanations are omitted.

Figure 6:
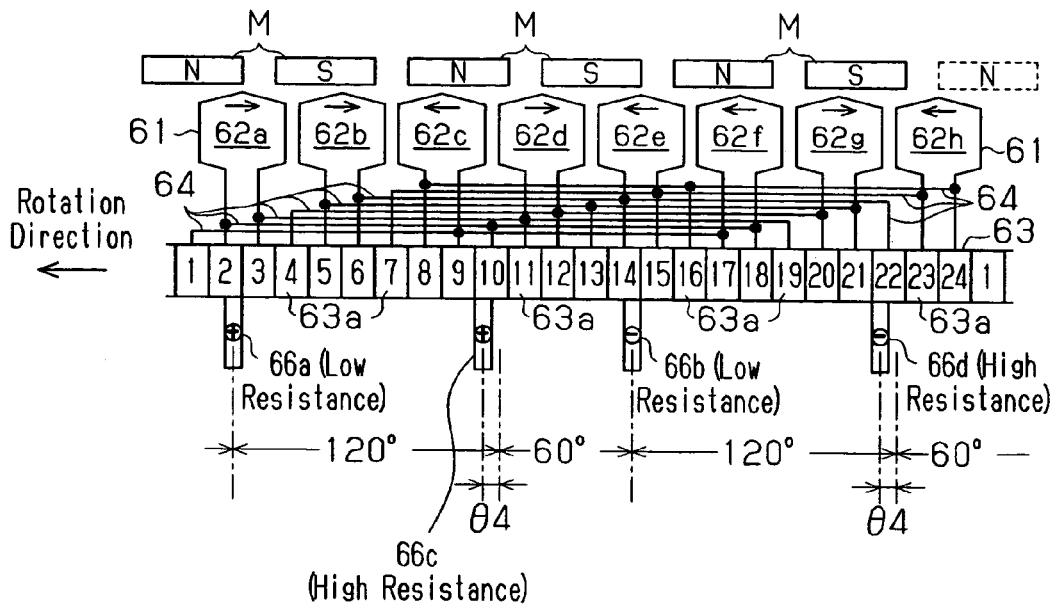
FIG. 6 is a developed diagram showing a commutator according to a fourth embodiment.

As shown in FIG. 6, first and second main brushes 66a, 66b, and first and second sub-brushes 66c, 66d have the same shape, and the width (effective contacting width) of the brushes 66a to 66d is half the width of a segment 63a. The main brushes 66a, 66b have a low resistance, and the sub-brushes 66c, 66d have a high resistance. In this embodiment, the first main brush 66a and the first sub-brush 66c form a first brush group. The second main brush 66b and the second sub-brush 66d form a second brush group.

The first main brush 66a, which is an anode, and the second main brush 66b, which is a cathode, are spaced apart by 180°. The first sub-brush 66c, which is an anode, is displaced from the first main brush 66a by a predetermined angle (120°−θ4) with respect to the direction opposite to the rotation direction. The second sub-brush 66d, which is a cathode, is displaced from the second main brush 66b by a predetermined angle (120°−θ4) with respect to the direction opposite to the rotation direction. The angle θ4 corresponds to one-half of the width of each segment 63a (which, in this case, is the width of each of the brushes 60a to 60d) along the circumferential direction of the commutator 63.

When the first main brush 66a is contacting a trailing portion of the No. 2 segment 63a with respect to the rotation direction of the commutator 63, the first sub-brush 66c contacts an advancing portion of the No. 10 segment 63a, which is short-circuited with the No. 2 segment 63a. In this case, the second main brush 66b contacts a trailing portion of the No. 14 segment 63a with respect to the rotation direction, and the second sub-brush 66d contacts an advancing portion of the No. 22 segment 63a, which is short-circuited with the No. 14 segment 63a.

When the commutator 63 is rotated in rotation direction as indicated in FIG. 6, the first main brush 66a and the first sub-brush 66c, which form the first brush group, separate from the short-circuited two of the segments 63a at different times of a predetermined interval. Specifically, the first sub-brush 66c, which has a high resistance, separates from the No. 10 segment 63a when a predetermined time has elapsed since the first main brush 66a, which has a low resistance, separates from the No. 2 segment 63a. The second main brush 66b and the second sub-brush 66d, which form the second brush group, separate from the short-circuited two of the segments 63a at different times of a predetermined interval. Specifically, the second sub-brush 66d, which has a high resistance, separates from the No. 22 segment 63a when a predetermined time has elapsed since the second main brush 66b, which has a low resistance, separates from the No. 14 segment 63a.

This configuration permits sparks to be generated only at the sub-brushes 66c, 66d. As a result, abrasion of the brushes 66a to 66d due to sparks is reduced. This extends the lives of the brushes 66a to 66d, and thus extends the life of the motor. Since the brushes 66a to 66d need not have a multi-layered structure with high-resistance portions and low-resistance portions, the cost is reduced. Since the main brushes 66a, 66b have a low resistance, an electrical loss at all the brushes 66a to 66d is suppressed. This minimizes a decrease in the power of the motor.

A fifth embodiment of the present invention will now be described with reference to FIG. 7. To facilitate illustration, like or the same reference numerals are given to those components that are like or the same as the corresponding components of the embodiment of FIG. 5 and detailed explanations are omitted.

Figure 7:
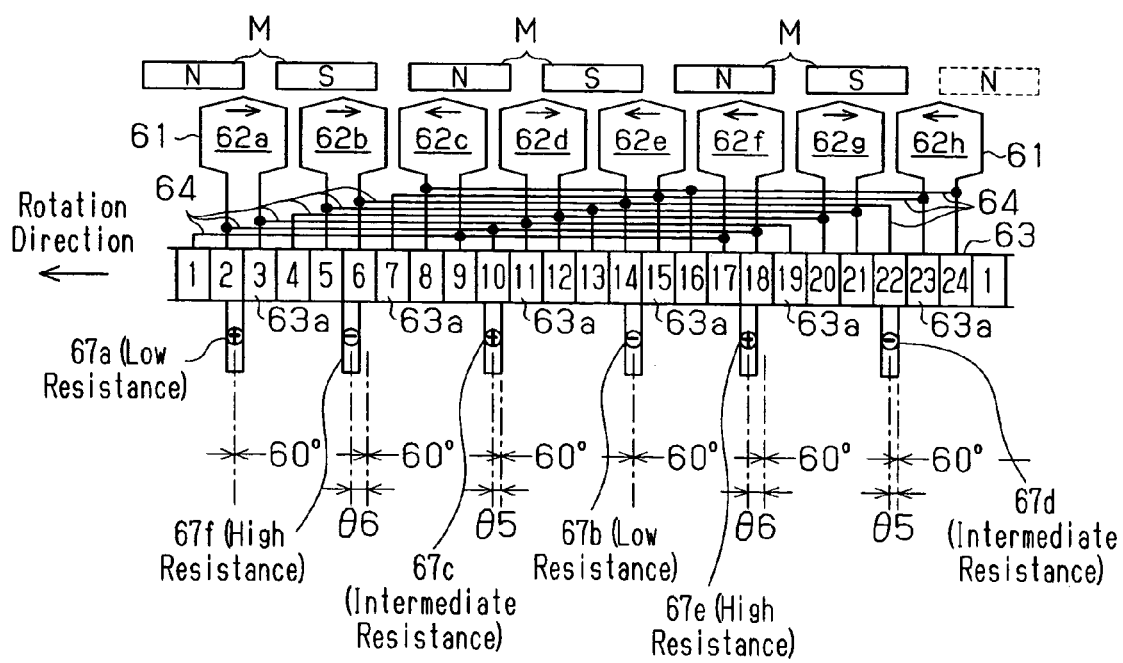
FIG. 7 is a developed diagram showing a commutator according to a fifth embodiment.

As shown in FIG. 7, six supply brushes, or first and second main brushes 67a, 67b, first to fourth sub-brushes 67c, 67d, 67e, 67f, slide on the commutator 63. The brushes 67a to 67f are identical and the width (effective contacting width) of the brushes 67a to 67f is half the width of each segment 63a. The first and second main brushes 67a, 67b have a low resistance. The third and fourth sub-brushes 67e, 67f have a high resistance. The first and second sub-brushes 67c, 67d have a intermediate resistance, which is between the resistance of the first and second main brushes 67a, 67b and the resistance of the third and fourth sub-brushes 67e, 67f. The first main brush 67a, the first sub-brush 67c, and the third sub-brush 67e form a first brush group. The second main brush 67b, the second sub-brush 67d, and the fourth sub-brush 67f form a second brush group.

The brushes 67a to 67f are arranged at 60° intervals. Specifically, the first main brush 67a, which is an anode, and the second main brush 67b, which is a cathode, are spaced apart by 180°. The first sub-brush 67c, which is an anode, is displaced from the first main brush 67a by a predetermined angle (120°−θ5) with respect to the direction opposite to the rotation direction. The second sub-brush 67d, which is a cathode, is displaced from the second main brush 67b by a predetermined angle (120°−θ5) with respect to the direction opposite to the rotation direction. The angle θ5 corresponds to one-quarter of the width of each segment 63a (which, in this case, is the width of each of the brushes 67a to 67f) along the circumferential direction of the commutator 63.

The third sub-brush 67e, which is an anode, is displaced from the second main brush 67b by a predetermined angle (60°−θ6) with respect to the direction opposite to the rotation direction. The fourth sub-brush 67f, which is a cathode, is displaced from the first main brush 67a by a predetermined angle (60°−θ6) with respect to the direction opposite to the rotation direction. The angle θ6 is an angle that corresponds to the half of the width of each segment 63a (which, in this case, is the width of each of the brushes 67a to 67f) along the circumferential direction of the commutator 63.

When the first main brush 67a is contacting a trailing portion of the No. 2 segment 63a with respect to the rotation direction of the commutator 63, the first sub-brush 67c contacts a middle portion of the No. 10 segment 63a, which is short-circuited with the No. 2 segment 63a, with respect to the rotation direction, and the fourth sub-brush 67e contacts an advancing portion of the No. 18 segment 63a, which is short-circuited with the No. 2 and No. 10 segments 63a, with respect to the rotation direction. In this case, the second main brush 67b contacts a trailing portion of the No. 14 segment 63a with respect to the rotation direction, the first sub-brush 67d contacts a middle portion of the No. 22 segment 63a, which is short-circuited with the No. 14 segment 63a, with respect to the rotation direction, and the fourth sub-brush 67f contacts an advancing portion of the No. 6 segment 63a, which is short-circuited with the No. 14 and No. 22 segments 63a, with respect to the rotation direction.

When the commutator 63 is rotated in rotation direction as indicated in FIG. 7, the first main brush 67a, the first sub-brush 67c, and the third sub-brush 67e, which form the first brush group, separate from the short-circuited three of the segments 63a at different times of a predetermined interval. Specifically, the first sub-brush 67c, which has an intermediate resistance, separates from the No. 10 segment 63a when a predetermined time has elapsed since the first main brush 67a, which has a low resistance, separates from the No. 2 segment 63a. Thereafter, the third sub-brush 67e, which has a high resistance, separates from the No. 18 segment 63a. The second main brush 67b, the second sub-brush 67d, and the fourth sub-brush 67f, which form the second brush group, separate from the short-circuited three of the segments 63a at different times of a predetermined interval. Specifically, the second sub-brush 67d, which has an intermediate resistance, separates from the No. 22 segment 63a when a predetermined time has elapsed since the second main brush 67b, which has a low resistance, separates from the No. 14 segment 63a. Thereafter, the fourth sub-brush 67f, which has a high resistance, separates from the No. 6 segment 63a.

Thus, sparks are generated only at the third and fourth sub-brushes 67e, 67f, which have a high resistance. In other words, sparks are prevented from being generated at the main brushes 67a, 67b, which have a low resistance, and the first and second sub-brushes 67c, 67d, which have an intermediate resistance. Since the third and fourth sub-brushes 67e, 67f have a high resistance, generated sparks are small.

As a result, abrasion of the brushes 67a to 67f due to sparks is reduced. This extends the lives of the brushes 67a to 67f, and thus extends the life of the motor. Since the brushes 67a to 67f need not have multi-layered structure with high-resistance portions and low-resistance portions, the cost is reduced. Since the main brushes 67a, 67b have a low resistance, and the first and second sub-brushes 67c, 67d have an intermediate resistance, an electrical loss is suppressed. This minimizes a decrease in the power of the motor.

A sixth embodiment of the present invention will now be described with reference to FIG. 8. To facilitate illustration, like or the same reference numerals are given to those components that are like or the same as the corresponding components of the embodiment of FIGS. 1(a) to 4 and detailed explanations are omitted.

Figure 8:
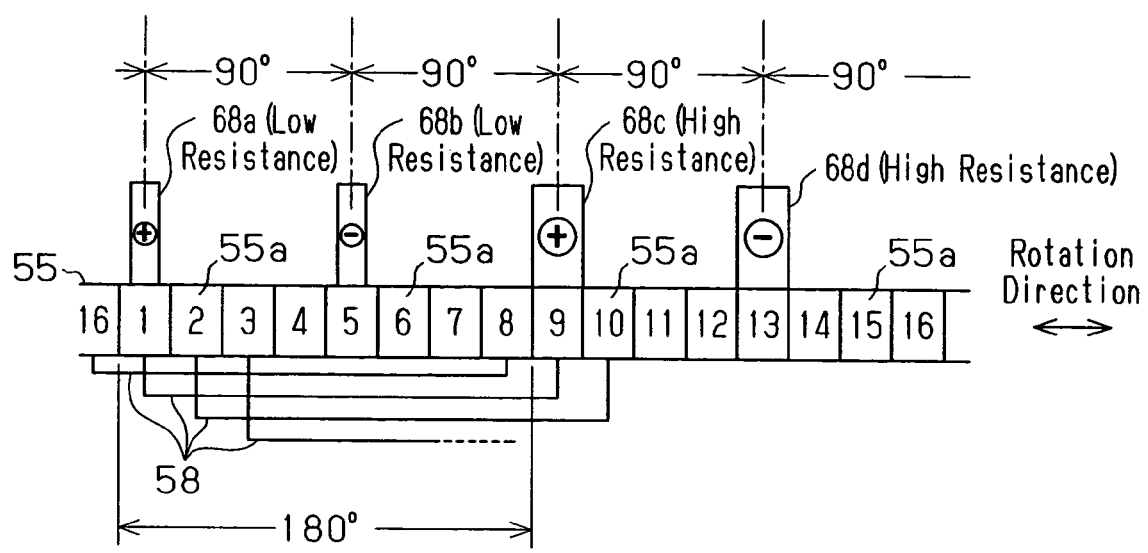
FIG. 8 is a developed diagram showing a commutator according to a sixth embodiment.

As shown in FIG. 8, four supply brushes, or first and second main brushes 68a, 68b, and first and second sub-brushes 68c, 68d, slide on the commutator 55. The width of the sub-brushes 68c, 68d are greater than that of the main brushes 68a, 68b. In this embodiment, the width (effective contacting width) of the main brush 68a, 68b corresponds to one-half of the width of each segment 55a, and the width (effective contacting width) of the sub-brushes 68c, 68d is substantially equal to the width of each segment 55a. The main brushes 68a, 68b have a low resistance, and the sub-brushes 68c, 68d have a high resistance. In this embodiment, the first main brush 68a and the first sub-brush 68c form a first brush group. The second main brush 68b and the second sub-brush 68d form a second brush group.

The brushes 68a to 68d are arranged at 90° intervals. Specifically, the second main brush 68b, which is a cathode, is displaced from the first main brush 68a, which is an anode, by 90° with respect to the rotation direction (rightward as viewed in FIG. 8). The first sub-brush 68c, which is an anode, is displaced from the first main brush 68a by 180°. The second sub-brush 68d, which is a cathode, is displaced from the second main brush 68b by 180°.

When the first main brush 68a is contacting a middle portion of the No. 1 segment 55a with respect to the rotation direction of the commutator, the first sub-brush 68c only contacts the No. 9 segment 55a, which is short-circuited with the No. 1 segment 55a. In this case, the second main brush 68b contacts a middle portion of the No. 5 segment 55a with respect to the rotation direction, and the second sub-brush 68d only contacts the No. 13 segment 55a, which is short-circuited with the No. 5 segment. 55a.

When the commutator 55 is rotated in either direction, the first main brush 68a and the first sub-brush 68c, which form the first brush group, separate from the short-circuited two of the segments 55a at different times of a predetermined interval. The second main brush 68b and the second sub-brush 68d, which form the second brush group, separate from the short-circuited two of the segments 55a at different times of a predetermined interval.

In this embodiment, if the motor (commutator 55) is rotated in either direction, sparks are generated only at the sub-brushes 68c, 68d, which have a high resistance, when the sub-brushes 68c, 68d are separating from the corresponding segments 55a. As a result, without limiting the rotation direction of the motor, abrasion of the brushes 68a to 68d due to sparks is reduced. This extends the lives of the brushes 68a to 68d, and thus extends the life of the motor. Since the brushes 68a to 68d need not have a multi-layered structure with high-resistance portions and low-resistance portions, the cost is reduced. Since the main brushes 68a, 68b have a low resistance, an electrical loss is suppressed. This minimizes a decrease in the power of the motor.

A seventh embodiment of the present invention will now be described with reference to FIGS. 9 to 13.

Figure 9:
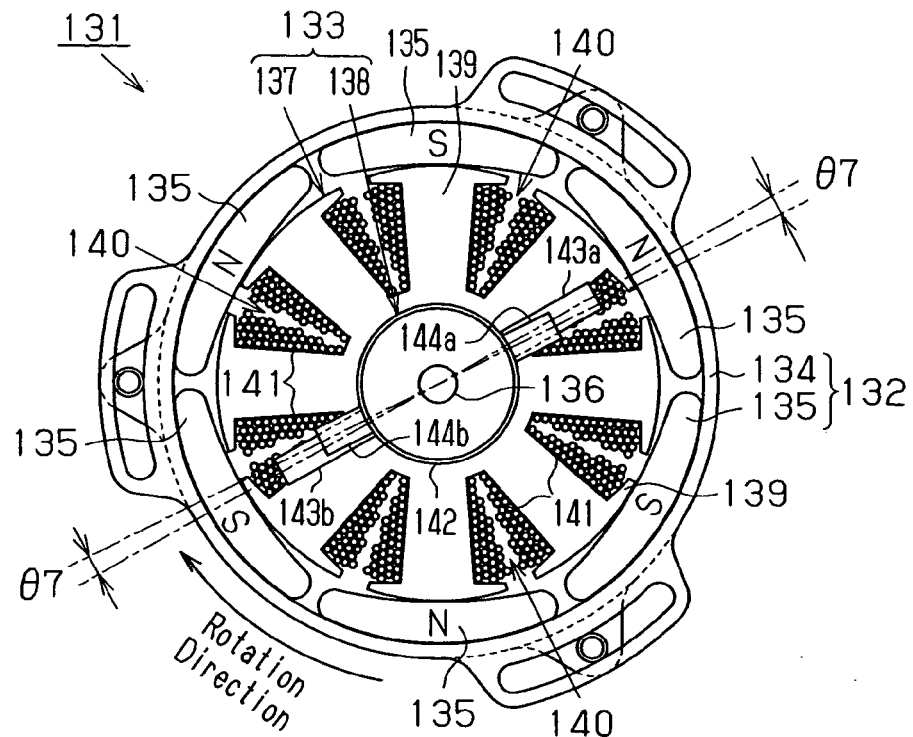
FIG. 9 is a schematic view showing a motor according to a seventh embodiment.

As shown in FIG. 9, a motor 131 of this embodiment has a stator 132 and an armature 133. The stator 132 includes a yoke 134 and magnets 135 provided in the yoke 134. The number of the magnets 135 is six in this embodiment. The magnets 135 function as magnetic poles. The six magnets 135 are arranged on the inner surface of the yoke 134 at equal angular intervals.

The armature 133 includes a rotary shaft 136, a core 137, and a commutator 138. The core 137 is fixed to an axial center portion of the rotary shaft 136. The commutator 138 is fixed to a portion of the rotary shaft 136 that is close to one end. The rotary shaft 136 is supported by the yoke 134 with bearings (not shown), so that the armature 133 is located in the yoke 134 and surrounded by the magnets 135. The armature 133 (the commutator 138) rotates only in one direction as indicated by an arrow in FIG. 9.

The core 137 has teeth 139, the number of which is eight in this embodiment. The teeth 139 are arranged about the axis of the rotary shaft 136 at equal angular intervals. A slot 140 is defined between each adjacent pair of the teeth 139. A wire 141 is wound about each tooth 139 with an insulator (not shown). The wound wires 141 function as excitation coils. In this embodiment, each wire 141 is wound about the corresponding tooth 139 by way of concentrated winding.

The commutator 138 is substantially cylindrical. Twenty-four segments 142 are fixed to the outer circumference of the commutator 55. The segments 142 are arranged in equal angular intervals. The ends of each wire 141, which is wound about one of the teeth 139, are connected to an adjacent pair of the segments 142.

The segments 142 are divided into groups of three segments 143 that are spaced by 120° intervals about the axis of the rotary shaft 136. The segments 143 in each group are at the same potential. The three segments 142 in each group are short-circuited with one of the short-circuit lines. The number of the short-circuit lines is eight in this embodiment. Each of the segments 142 to which the wires 141 are not connected is connected to a middle portion of one of the short-circuit lines.

The motor 131 includes first and second main brushes 143a, 143b, which are supply brushes, and first and second sub-brushes 144a, 144b, which are non-supply brushes. The first and second main brushes 143a, 143b, and the first and second sub-brushes 144a, 144b are held by brush holders (not shown) such that the brushes 143a, 143b, 144a, 144b slide on the outer circumference of the commutator 138 and the segments 142.

The main brushes 143a, 143b have a low resistance. The sub-brushes 144a, 144b have a resistance higher than that of the main brushes 143a, 143b.

The width (the length along the circumference of the commutator 138) of the main brushes 143a, 143b, and the sub-brushes 144a, 144b is substantially equal to that of the segments 142. The height (length in the axial direction of the rotary shaft 136) and the length (the length in the radial direction of the rotary shaft 136) of the sub-brushes 144a, 144b are less than those of the main brushes 143a, 143b. Therefore, each of the sub-brushes 144a, 144b has a less volume than each of the main brushes 143a, 143b. Since the sub-brushes 144a, 144b do not supply electricity to the wires 141, the sub-brushes 144a, 144b are worn by a relatively small degree with heat and electricity. The abrasion of the sub-brushes 144*a*, 144*b* therefore does not affect the power of the motor 131.

Figure 10:
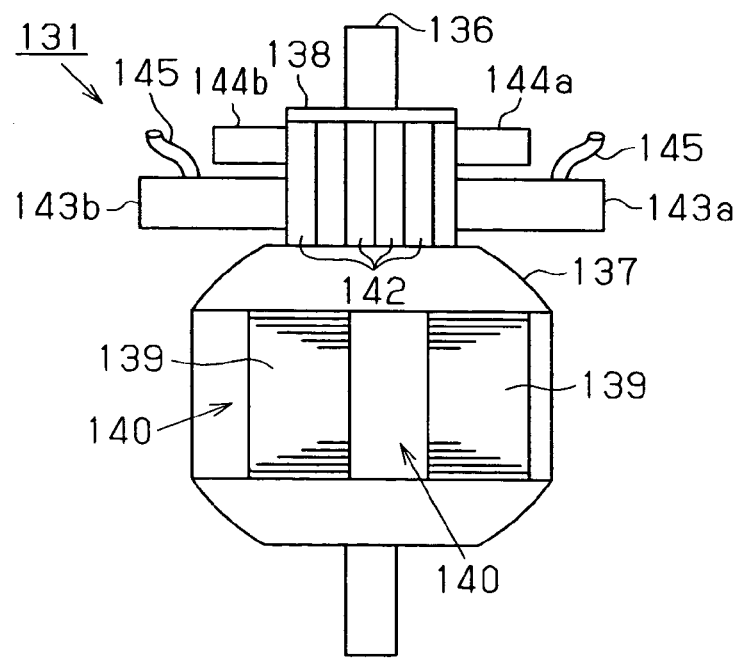
FIG. 10 is a schematic view showing the motor of FIG. 9.

The main brushes 143*a*, 143*b* are spaced apart by 180° about the axis of the rotary shaft 136. Likewise, the sub-brushes 144*a*, 144*b* are spaced apart by 180° about the axis of the rotary shaft 136. As shown in FIG. 10, with respect to a direction perpendicular to the axis of the rotary shaft 136, the sub-brushes 144*a*, 144*b* are substantially parallel to the main brush 143*a*, 143*b*. Also, with respect to the axial direction of the rotary shaft 136, the sub-brushes 144*a*, 144*b* are located above the main brushes 143*a*, 143*b*. As shown in FIG. 9, each of the sub-brushes 144*a*, 144*b* is displaced from the corresponding one of the main brushes 143*a*, 143*b* by a predetermined angle θ7 with respect to the rotation direction of the commutator 158. The main brush 143*a* and the sub-brush 144*a* form a first brush group. The main brush 143*b* and the sub-brush 144*b* form a second brush group.

Figure 11:
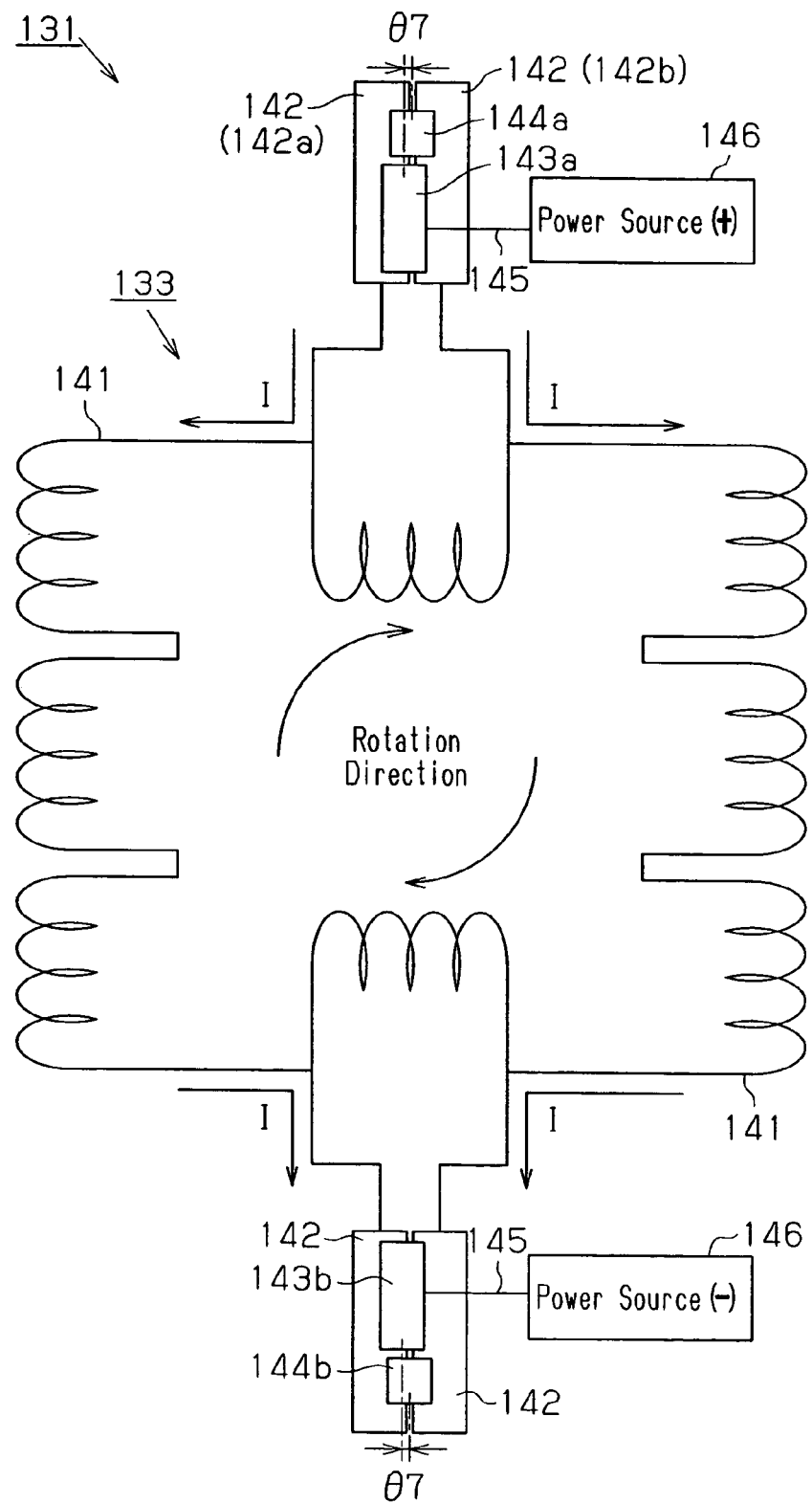
FIG. 11 is a circuit diagram of the motor shown in FIG. 9.

As shown in FIG. 11, the main brush 143*a* is connected to a positive terminal of a power source 146 with a pigtail 145. The main brush 143*b* is connected to a negative terminal of the power source 146 with a pigtail 145. When contacting any of the segments 142, the main brushes 143*a*, 143*b* supply electricity to the wires 141, which function as excitation coils connected to the contacting segments 142. Also, as the armature 133 (the commutator 138) rotates, each of the main brushes 143*a*, 143*b* short-circuits each adjacent pair of the segments 142, consecutively.

On the other hand, the sub-brushes 144*a*, 144*b* are not connected to the power source 146. That is, the sub-brushes 144*a*, 144*b* do not have a function as supply brushes as the main brushes 143*a*, 143*b*, but only short-circuit each adjacent pair of the segments 142, consecutively, as the armature 133 (the commutator 138) rotates.

The operation of the motor 131 will now be described. An operation of the main brush 143*a* and the sub-brush 144*a*, which form the first brush group, will be described. Since the main brush 143*b* and the sub-brush 144*b*, which form the second brush group, operate in the same manner as the first brush group, description of an operation of the second brush group is omitted.

Figure 12:
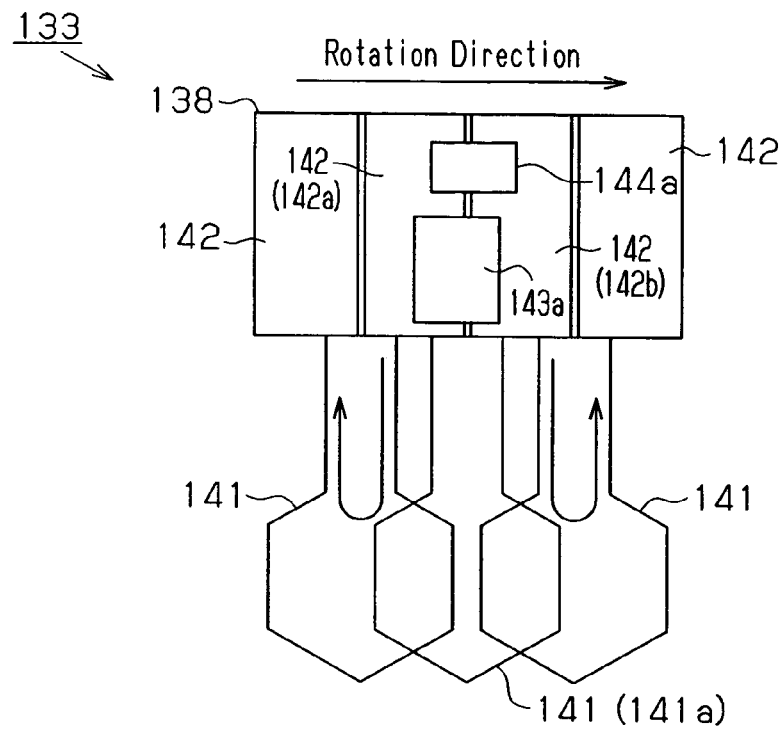
FIG. 12 is a diagram showing commutation.

When the main brush 143*a* contacts adjacent two segment elements 142*a*, 142*b* as shown in FIG. 12, electricity is supplied to the corresponding wire 141 through the segment elements 142*a*, 142*b*. At the same time, the main brush 143*a* short-circuits the segment elements 142*a*, 142*b*. Accordingly, the wires 141*a* connected to the segment elements 142*a*, 142*b* are commutated.

The sub-brush 144*a* also contacts the same adjacent pair of the segment elements 142*a*, 142*b* contacting the main brush 143*a*, and short-circuits the segment elements 142*a*, 142*b*.

Figure 13:
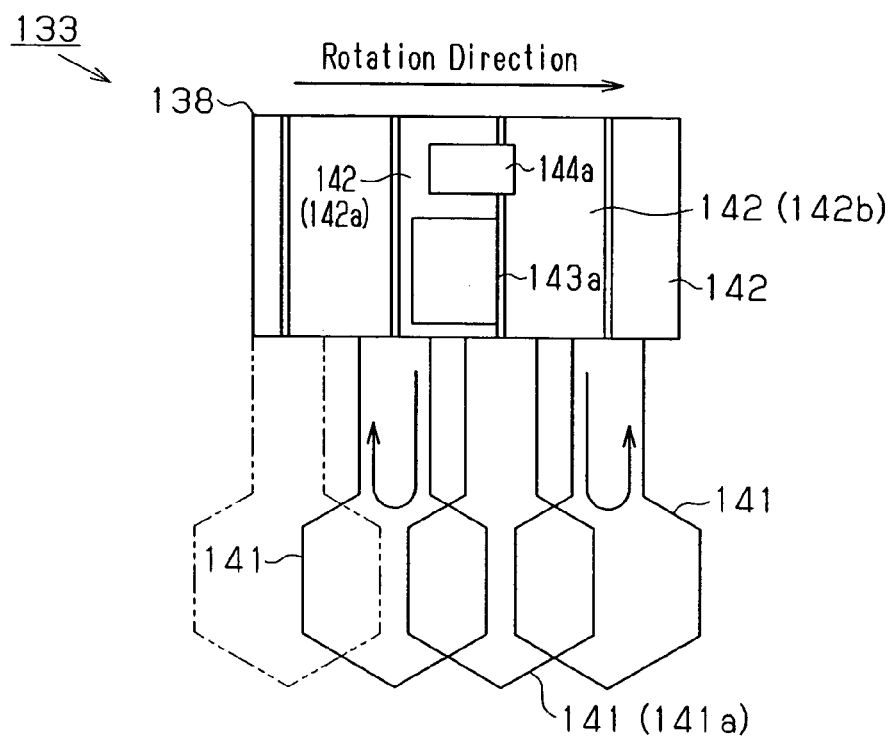
FIG. 13 is a diagram showing commutation.

Then, as the commutator 138 rotates as shown in FIG. 13, the main brush 143*a* separates from the first segment element 142*b*, which is located downstream with respect to the rotation direction (to the right as viewed in FIG. 13), and contacts only the upstream second segment element 142*a*.

The width of the main brush 143*a* and the sub-brushes 144*a* is substantially the same as the width of each segment 142. The sub-brush 144*a* is spaced from the main brush 143*a* by the predetermined angle θ7 in the rotation direction of the commutator 138.

That is, the distance between an end face of the main brush 143*a* at one side with respect to the rotation direction and an end face of the sub-brush 144*a* at the other side of the rotation direction, or effective contacting width, is greater than the width of each segment 142 with respect to the rotation direction of the commutator 138.

Therefore, when the main brush 143*a* separates from the first segment element 142*b* and contacts only the second segment element 142*a* as shown in FIG. 13 as the commutator 138 rotates, the sub-brush 144*a* contacts both of the second segment element 142*a* and the first segment element 142*b*.

That is, the sub-brush 144*a* separates from the first segment element 142*b* when a predetermined time, during which the commutator 138 rotates the predetermined angle θ7, has elapsed after the main brush 143*a* separates from the first segment element 142*b*. During the predetermined period, the segment elements 142*a*, 142*b* are short-circuited with the sub-brush 144*a*.

This embodiment provides the following advantages.

In the motor 131 of this embodiment, the sub-brush 144*a* short-circuits the segment elements 142*a*, 142*b* with each other for a predetermined period after the main brush 143*a* separates from the first segment element 142*b*. Few sparks are generated at the sub-brush 144*a*, which has a high resistance.

Thus, since generation of sparks at the brushes 143*a* to 143*d* is suppressed, abrasion of the main brushes 143*a*, 143*b*, which are supply brushes, is reduced. As a result, the life of the motor 131 is extended.

Further, since the main brushes 143*a*, 143*b* are separately arranged from the sub-brushes 144*a*, 144*b*, the configuration is simplified as compared to a motor discussed in the prior art section, which has brushes with a laminated structure. Accordingly, the cost is reduced. Also, since the sub-brushes 144*a*, 144*b* need not be supplied with electricity, the cost is reduced. This advantage is remarkable for a motor having a great number of brushes.

The sub-brushes 144*a*, 144*b* are not connected to the power source 146. The wires 141 are supplied with electricity from the power source 146 only through the main brushes 143*a*, 143*b*. Thus, the sub-brushes 144*a*, 144*b* can be designed to have a higher resistance than the main brushes 143*a*, 143*b*. Therefore, the resistance of the passages for short-circuiting commutation coils can be increased while maintaining the resistance of the supply brushes low. This improves the commutation. As a result, compared to the motor discussed in the prior art section, which has brushes of a multi-layered structure, the power of the motor 131 is increased.

The first sub-brush 144*a* is located above the first main brush 143*a* with respect to the axial direction, and the second sub-brush 144*b* is located above the second main brush 143*b* with respect to the axial direction.

Since the sub-brushes 144*a*, 144*b* each contact the same one of the segments 142 as the corresponding one of the main brushes 143*a*, 143*b*, this embodiment may be applied to a motor having no short-circuit lines.

An eighth embodiment of the present invention will now be described with reference to FIGS. 14 and 15. To facilitate illustration, like or the same reference numerals are given to those components that are like or the same as the corresponding components of the embodiment of FIGS. 9 to 13 and detailed explanations are omitted.

Figure 14:
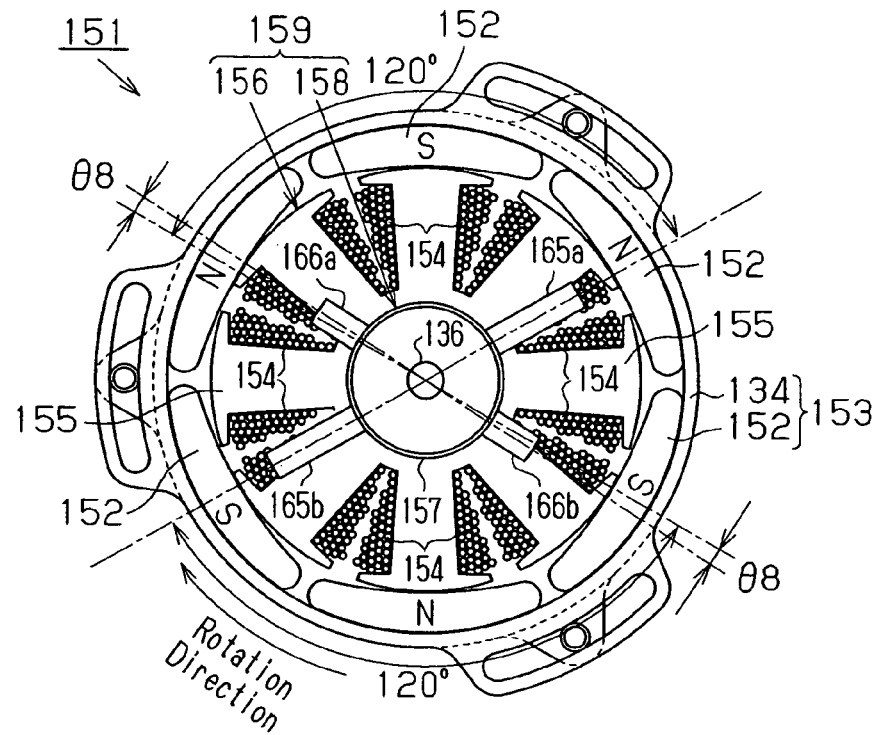
FIG. 14 is a schematic: view showing a motor according to an eighth embodiment.

As shown in FIG. 14, a motor 151 has a stator 153 and an armature 159. The stator 153 has six magnets 152. The armature 159 has a core 156 and a commutator 158. The core 156 has eight teeth 155. Twenty-four segments 157 are provided on the outer circumference of the commutator 158. A wire 154 is wound about each tooth 155.

Figure 15:
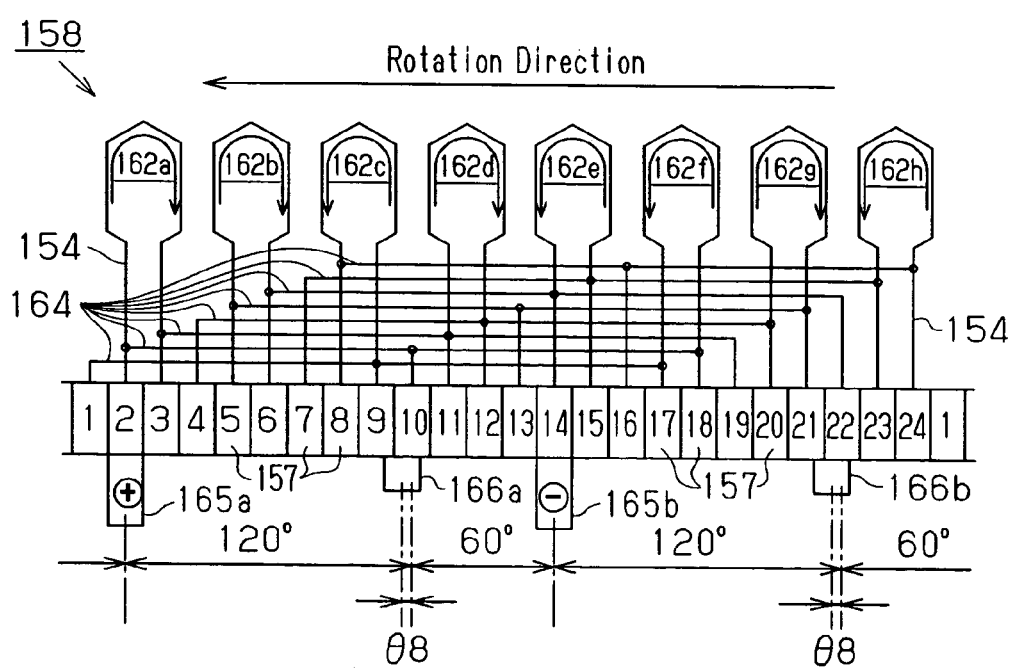
FIG. 15 is a developed diagram showing the wires of the motor shown in FIG. 14.

As shown in FIG. 15, wires 154 are wound about teeth 155 by way of concentrated winding and form eight excitation coils 162a to 162h. Numerals 1 to 24 are given to the segments 157 shown in FIG. 15 in order along the circumferential direction of the commutator 158.

Specifically, one of the wires 154 is connected to the No. 2 segment 157 and the No. 3 segment 157, and is wound about a predetermined one of the teeth 155 to form the first excitation coil 162a. One of the wires 154 is connected to the No. 5 segment 157 and the No. 6 segment 157, and is wound about a predetermined one of the teeth 155 to form the second excitation coil 162b. One of the wires 154 is connected to the No. 8 segment 157 and the No. 9 segment 157, and is wound about a predetermined one of the teeth 155 to form the third excitation coil 162c. One of the wires 154 is connected to the No. 11 segment 157 and the No. 12 segment 157, and is wound about a predetermined one of the teeth 155 to form the fourth excitation coil 162d. One of the wires 154 is connected to the No. 14 segment 157 and the No. 15 segment 157, and is wound about a predetermined one of the teeth 155 to form the fifth excitation coil 162e. One of the wires 154 is connected to the No. 17 segment 157 and the No. 18 segment 157, and is wound about a predetermined one of the teeth 155 to form the sixth excitation coil 162f. One of the wires 154 is connected to the No. 20 segment 157 and the No. 21 segment 157, and is wound about a predetermined one of the teeth 155 to form the seventh excitation coil 162g. One of the wires 154 is connected to the No. 23 segment 157 and the No. 24 segment 157, and is wound about a predetermined one of the teeth 155 to form the eighth excitation coil 162h.

The segments 157 are divided into groups of three segments 157 that are spaced by 120° about the axis of the rotary shaft 136. The three segments 157 in each group are short-circuited with one of eight short-circuit lines 164. Specifically, one of the short-circuit lines 164 short-circuits No. 1, No. 9, and No. 17 segments 157. The other short-circuit line 164 short-circuits No. 2, No. 10, and No. 18 segments 157. The other short-circuit line 164 short-circuits No. 3, No. 11, and No. 19 segments 157. The other short-circuit line 164 short-circuits No. 4, No. 12, and No. 20 segments 157. Another short-circuit line 164 short-circuits No. 5, No. 13, and No. 21 segments 157. The other short-circuit line 164 short-circuits No. 6, No. 14, and No. 22 segments 157. The other short-circuit line 164 short-circuits No. 7, No. 15, and No. 23 segments 157. The other short-circuit line 164 short-circuits No. 8, No. 16, and No. 24 segments 157. Therefore, three segments 157 in the same group, which are spaced by 120° about the axis of the rotary shaft 136, are at the same potential.

As shown in FIG. 14, the motor 151 has a pair of main brushes 165a, 165b, which function as supply brushes, and sub-brushes 166a, 166b, which function as non-supply brushes. The main brushes 165a, 165b, and the sub-brushes 166a, 166b are held by brush holders (not shown) such that the brushes 165a, 165b, 166a, 166b slide on the outer circumference of the commutator 158, or the segments 157.

The main brushes 165a, 165b have a low resistance. The sub-brushes 166a, 166b have a resistance higher than that of the main brushes 165a, 165b. The width (the length along the circumference of the commutator 158 (effective contacting width)) of the main brushes 165a, 165b, and the sub-brushes 166a, 166b is substantially equal to that of the segments 157. The height (length in the axial direction of the rotary shaft 136) and the length (the length in the radial direction of the rotary shaft 136) of the sub-brushes 166a, 166b are less than those of the main brushes 165a, 165b.

That is, each of the sub-brushes 166a, 166b has less volume than each of the main brushes 165a, 165b. The first main brush 165a and the first sub-brush 166a form a first brush group. The second main brush 165b and the second sub-brush 166b form a second brush group.

Electric current supplied from the main brush 165a is split into two. A portion of the current is supplied to the fourth excitation coil 162d, which is spaced from the first excitation coil 162a by 135°, the seventh excitation coil 162g, which is spaced from the fourth excitation coil 162d by 135°, and the second excitation coil 162b, which is separated from the seventh excitation coil 162g by 135°. The other portion of the current is supplied to the third excitation coil 162c, which is spaced from the sixth excitation coil 162f by 135°, the eighth excitation coil 162h, which is spaced from the third excitation coil 162c by 135°, and the fifth excitation coil 162e, which is separated from the eighth excitation coil 162h by 135°.

In this embodiment, the main brushes 165a, 165b are displaced by 180° about the axis of the rotary shaft 136. Each of the sub-brushes 166a, 166b is at a position displaced from one of the main brushes 165a, 165b approximately by 120° in the direction opposite to the rotational direction of the commutator 158, or leftward as viewed in FIG. 15.

Specifically, the first sub-brush 166a is displaced from the first main brush 165a by a predetermined angle (120°−θ8) with respect to the direction opposite to the rotation direction. Likewise, the second sub-brush 166b is displaced from the second main brush 165b by the predetermined angle (120°−θ8) with respect to the direction opposite to the rotation direction.

The main brushes 165a, 165b, which function as supply brushes, are connected to a power source (not shown). The first main brush 165a is connected to a positive terminal of the power source, and the second main brush 165b is connected to a negative terminal of the power source. The sub-brushes 166a, 166b, which function as non-supply brushes, are not connected to the power source.

The operation of the motor 151 will now be described.

FIG. 15 illustrates a state in which, as the commutator 158 rotates, the first main brush 165a contacts only the No. 2 segment 157, and the second main brush 165b contacts the No. 14 segment 157. In this state, most of the first brush 166a contacts the No. 10 segment 157, which is displaced by 120° from the No. 2 segment 157 in the direction opposite to the rotation direction. Also, most of the second sub-brush 166b contacts the No. 22 segment 157, which is displaced by 120° from the No. 14 segment 157 in the direction opposite to the rotation direction.

The center of the first sub-brush 166a with respect to the rotation direction of the commutator 158 is displaced by an angle θ8 in the rotation direction from a position that is displaced from the first main brush 165a by 120° in the direction opposite to the rotation direction. The first sub-brush 166a is therefore contacting the No. 9 segment 157, which is adjacent to the No. 10 segment 157. Also, the center of the second sub-brush 166b with respect to the rotation direction of the commutator 158 is displaced by an angle θ8 in the rotation direction from a position that is displaced from the second main brush 165b by 120° in the direction opposite to the rotation direction.

When the commutator 158 is rotated in rotation direction as indicated in FIG. 15, the first main brush 165a and the first sub-brush 165c, which form the first brush group, separate from the short-circuited two of the segments 157 at different times of a predetermined interval. Specifically, the first sub-brush 166a, which has a high resistance, separates from the No. 10 segment 157 when a predetermined time has elapsed since the first main brush 165a, which has a low resistance, separates from the No. 2 segment 157. The second main brush 165b and the second sub-brush 166b, which form the second brush group, separate from the short-circuited two of the segments 157 at different times of a predetermined interval. Specifically, the second sub-brush 166b, which has a high resistance, separates from the No. 22 segment 157 when a predetermined time has elapsed since the second main brush 165b, which has a low resistance, separates from the No. 14 segment 157.

Although sparks are liable to be generated mostly at a portion of the first sub-brush 166a that lastly separates from the No. 9 segment 157 and at a portion of the second sub-brush 166b that lastly separates from the No. 21 segment 157, sparks are scarcely generated since the sub-brushes 166a, 166b have a high resistance.

Since the sub-brushes 166a, 166b and the main brushes 165a, 165b are arranged in a single plane with respect to the circumferential direction of the commutator 158, the axial measurement of the motor 151 is reduced.

It should be apparent to those skilled in the art that the present invention may be embodied in many other specific forms without departing from the spirit or scope of the invention. Particularly, it should be understood that the invention may be embodied in the following forms.

In the embodiments of FIGS. 1(a) to 15, the number and the construction of the supply brushes may be changed as necessary.

In the embodiments of FIGS. 1(a) to 15, two or three supply brushes are used as anodes or cathodes. However, the number of brushes used as anodes or cathodes may be changed as long as at least either the anodes or the cathodes correspond to two or more brushes. For example, three brushes may be used. Specifically, one brush may be used as an anode and two brushes may be used as cathodes. Alternatively, two brushes may be used as anodes, and one brush may be used as a cathode.

In the embodiments of FIGS. 1(a) to 8, the sub-brushes 59c, 59d, 60c, 60d, 65c, 65d, 66c, 66d, 67e, 67f, 68c, 68d need not have a high resistance, but the volume of the sub-brushes may be increased by increasing the length in the axial direction. An increase in the volume of the sub-brushes extends the life of the sub-brushes.

In the embodiments of FIGS. 1(a) to 8, the lengths of the sub-brushes 59c, 59d, 60c, 60d, 65c, 65d, 66c, 66d, 67e, 67f, 68c, 68d, which have high resistances, may be reduced to be shorter than the other brushes so that the volume of the high-resistance sub-brushes is reduced. Since the high-resistance sub-brushes are less likely to be worn, reducing the volume of the sub-brushes does not shorten the life of the sub-brushes.

In the embodiment of FIG. 7, the positions of the main brushes 67a, 67b and the positions of the sub-brushes 67c, 67d may be switched, and the sub-brushes 67c, 67d may have a high resistance. This configuration eliminates the necessity of an expensive multi-layered structure for the brushes 67a to 67f. Also, the configuration reduces the electrical loss of all the brushes 67a to 67f, while causing sparks to be generated only at the high-resistance sub-brushes regardless of the rotation direction. That is, the rotation direction of the motor need not be limited.

In the embodiments of FIGS. 9 to 13, the width of the sub-brushes 144a, 144b along the circumferential direction of the commutator 138 may be more than that of the main brushes 143a, 143b.

In this configuration, since part of the sub-brushes 144a, 144b contacts the segments 142 first, the sub-brushes 144a 144b contact the segments 142 when the main brushes 143a, 143b are contacting the segments 142 located at an advancing side with respect to the rotation direction, and when the main brushes 143a, 143b are separating from the segments 142 at the trailing side. Accordingly, generation of sparks at the brushes is suppressed. Further, regardless of the rotation direction of the armature 133, sparks generated at the brushes are reduced.

In the embodiments of FIGS. 9 to 15, the volume of each of the sub-brushes 144a, 144b, 166a, 166b may be more than the volume of each of the main brushes 143a, 143b, 165a, 165b.

In the embodiment of FIGS. 14 and 15, the positions and the numbers of the main brush 165a, 165b functioning as supply brushes and the sub-brushes 166a, 166b functioning as non-supply brushes may be changed as necessary.

For example, a sub-brush may be located at a position displaced from the first main brush 165a in the rotation direction by an angle (120°−θ4), and another sub-brush may be located at a position displaced from the second main brush 165b in the rotation direction by the angle (120°−θ4).

In the embodiments of FIGS. 9 to 15, the wires 141 may be wound about the teeth 139 by way of distributed winding.

The embodiments of FIGS. 9 to 15 may be applied to a motor having no short-circuit lines.

In the embodiments of FIGS. 1(a) to 15, the number of the segments, the excitation coils, and the permanent magnets may be changed as necessary.

The present examples and embodiments are to be considered as illustrative and not restrictive and the invention is not to be limited to the details given herein, but may be modified within the scope and equivalence of the appended claims.

The invention claimed is:

1. A motor comprising:
a plurality of excitation coils;
a commutator having a plurality of segments, wherein each coil is connected to corresponding ones of the segments;
a plurality of supply brushes slidable on the segments, wherein the supply brushes include a plurality of supply brushes each having one of an anode and a cathode, and at least one supply brush having the other one of an anode and a cathode, and wherein the supply brushes each simultaneously contact different one of the segments; and
a short-circuit line for short-circuiting segments that simultaneously contact the supply brushes of the same pole,
wherein the supply brushes of the same pole separate from the short-circuited segments at different times, and wherein, among the supply brushes of the same pole, the supply brush that lastly separates from the short-circuited segment has a higher electrical resistance than the other supply brushes of the same pole.

2. The motor according to claim 1, wherein the segments are arranged along a circumferential direction of the commutator and have the same circumferential width;
wherein the supply brushes of the same pole have the same width as the segments along the circumferential direction of the commutator; and
wherein, when one of the supply brushes of the same pole is contacting one of the segments without displacement, the other supply brushes of the same pole contact the corresponding ones of the segments with displacement along the circumferential direction.

3. The motor according to claim 1, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein the effective contacting widths are the same as the circumferential width of the segments.

4. The motor according to claim 1, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein the effective contacting width of at least one of the supply brushes of the same pole is less than the circumferential width of the segments.

5. The motor according to claim 1, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein the effective contacting widths are less than the circumferential width of the segments.

6. The motor according to claim 1, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein, among the supply brushes of the same pole, the effective contacting width of the supply brush that lastly separates from the short-circuited segment is greater than the other supply brushes of the same poles.

7. A motor comprising:
a plurality of excitation coils;
a commutator having a plurality of segments, wherein each coil is connected to corresponding ones of the segments;
a plurality of supply brushes slidable on the segments, wherein the supply brushes include a plurality of supply brushes each having one of an anode and a cathode, and at least one supply brush having the other one of an anode and a cathode, and wherein the supply brushes each simultaneously contact different one of the segments; and
a short-circuit line for short-circuiting segments that simultaneously contact the supply brushes of the same pole,
wherein the supply brushes of the same pole separate from the short-circuited segments at different times, and
wherein, among the supply brushes of the same pole, the supply brush that lastly separates from the short-circuited segment has a greater volume than the other supply brushes of the same pole.

8. The motor according to claim 7, wherein the segments are arranged along a circumferential direction of the commutator and have the same circumferential width;
wherein the supply brushes of the same pole have the same width as the segments along the circumferential direction of the commutator; and
wherein when one of the supply brushes of the same pole is contacting one of the segments without displacement, the other supply brushes of the same pole contact the corresponding ones of the segments with displacement along the circumferential direction.

9. The motor according to claim 7, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein the effective contacting widths are the same as the circumferential width of the segments.

10. The motor according to claim 7, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein the effective contacting width of at least one of the supply brushes of the same pole is less than the circumferential width of the segments.

11. The motor according to claim 7, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein the effective contacting widths are less that the circumferential width of the segments.

12. The motor according to claim 7, wherein the segments are arranged along a circumferential direction of the commutator and have the same circumferential width;
wherein each of the supply brushes of the same pole has a predetermined effective contacting width along the circumferential direction of the commutator, in which effective contacting width the supply brush contacts segments, wherein, among the supply brushes of the same pole, the effective contacting width of the supply brush that lastly separates from the short-circuited segment is greater than the other supply brushes of the same pole.

13. A motor comprising;
six magnetic poles arranged at equal angular intervals along a circumferential direction, wherein each adjacent pair of the magnetic poles have different magnetic properties;
an armature having eight teeth, the teeth being arranged at equal angular intervals along a circumferential direction;
eight excitation coils, each being wound about one of the teeth by way of concentrated winding;
a commutator having twenty-four segments, wherein ends of each excitation coil are connected corresponding ones of the segments;
a plurality of short-circuiting members, wherein each short-circuiting member connects two of the segments that are connected to the excitation coils and one of the segments that are not connected to the excitation coils to one another, such that two of the excitation coils that are arranged at a 135° interval about the axis of the armature are simultaneously supplied with electricity, and wherein the segments in each group of short-circuited three segments are arranged at 120° intervals; and
a plurality of supply brushes slidable in the segments, wherein the supply brushes include first and second brushes at the same pole, wherein the second brush has a higher electrical resistance than the first supply brush, wherein the first and second supply brushes simultaneously contact the two segments in one of the sets of three segments that are connected to the corresponding excitation coils, wherein the first and second brushes are arranged at an angular interval less than 120°, so that, when the first brush separates from the contacting segment, the second brush separates from the segment that is short-circuited with the segment from which the first brush has separated after a delay.

* * * * *